L. L. GARIBALDI.
QUICK DETACHABLE DUST CAP.
APPLICATION FILED MAR. 15, 1916.
1,255,091.
Patented Jan. 29, 1918.
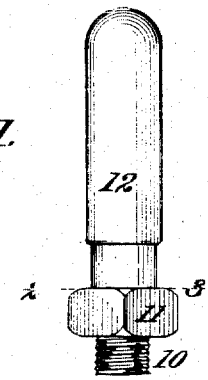
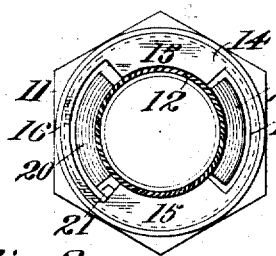
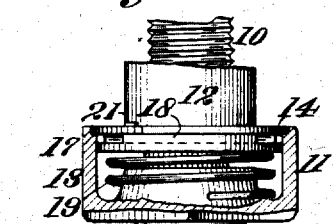
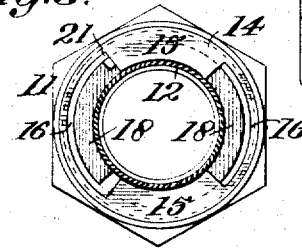
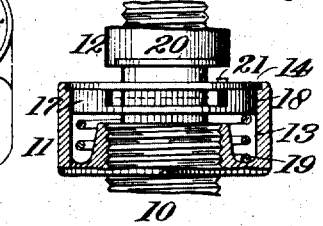
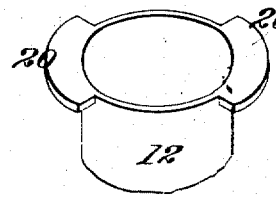
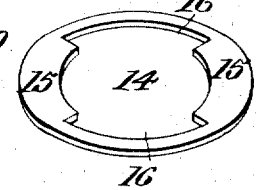
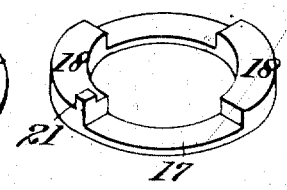
WITNESSES:
Charles Rokles
J H Herring
INVENTOR
Lester L. Garibaldi
BY Strong & Townsend
ATTORNEYS

UNITED STATES PATENT OFFICE.

LESTER L. GARIBALDI, OF OAKLAND, CALIFORNIA.

QUICK-DETACHABLE DUST-CAP.

1,255,091.  Specification of Letters Patent.  Patented Jan. 29, 1918.

Application filed March 15, 1916. Serial No. 84,350.

*To all whom it may concern:*

Be it known that I, LESTER L. GARIBALDI, a citizen of the United States, residing at Oakland, in the county of Alameda and State of California, have invented new and useful Improvements in Quick-Detachable Dust-Caps, of which the following is a specification.

This invention relates to a dust cap for pneumatic tire valves.

The ordinary pneumatic tire valve is provided with an exceedingly long, finely screw-threaded stem which projects through the felly of the wheel and carries a screw-threaded dust cap. This cap must be removed each time the tire is filled and the time consumed in removing and replacing the same is in many cases as great as that required to fill the tire. The frequency of this operation is such as to make it highly important to facilitate the removal and replacement of this dust cap, and it is with this object in view that I have produced the present invention.

In carrying out this object I employ in combination with a screw-threaded valve stem, a fastening nut adapted to be seated on the felly of the wheel, a dust cap to fit over the stem and spring actuated locking connections between the dust cap and the nut, whereby the former may be attached and detached in a minimum of time and with the smallest effort.

One form which my invention may assume is illustrated in the following description and exemplified in the accompanying drawings, in which—

Figure 1 shows a side elevation of a device embodying my invention.

Figs. 2 and 3 show sectional views in plan taken on the line 2—3 of Fig. 1, illustrating different positions of the locking connections employed.

Fig. 4 shows an inverted perspective view of the lower end of the dust cap.

Figs. 5 and 6 show vertical sectional views of the locking connections illustrating the same in locked and unlocked positions.

Fig. 7 shows a perspective view of the fastening nut employed in my device.

Figs. 8 and 9 show perspective views of different parts of said nut.

In the drawings I have shown a screw-threaded valve stem 10 fitted with a nut 11, the latter adapted to be seated against the wheel felly to hold the valve in place, as in the usual manner. The dust cap 12 is made to fit loosely over the stem and by means of a spring actuated locking connection with the nut is held in place thereon securely.

This quick detachable locking connection comprises a shell 13 formed on the exterior of the nut 11, closed at its inner end and having a permanently attached cap plate 14 on its outer end, said plate being formed as shown in Fig. 8 with opposed arcuate flanges 15 forming between them opposite recesses 16. Within the shell and lying adjacent the cap plate is a collar 17 provided with opposed up-standing lugs 18 of a size to project through the recesses 16 and lock the parts against relative turning, for a purpose hereinafter made clear. A coil spring 19 within the shell serves to retain the collar pressed into close engagement with the cap plate 14. The lower end of the dust cap 12 is provided with opposed arcuate wings 20 to enter the recesses 16, and when turned, to pass beneath the flanges 15 and be locked securely beneath the same by means of the spring-pressed collar 18.

When the dust cap is removed the collar 17 is positioned as shown in Fig. 6, where the lugs 18 are beneath the flanges 15 and the spring is compressed. The dust cap is then applied by inserting the wings 20 into the recesses 16, where they will pass below and rest upon the shallower portions of the collar 17. Thereupon the dust cap may be turned within the nut, which will rotate the collar until the lugs 18 are brought into register with the recesses 16, at which time the spring 19 will force the collar outwardly and lock the parts against further rotation. The wings 20 on the dust cap will at this time be seated between the lugs 18 and lie beneath the flanges 15. To remove the dust cap, it is only necessary to press inwardly against the tension of the spring until the collar is sufficiently compressed to permit the lugs 18 to clear the flanges 15, whereupon the cap may be rotated to bring the wings into register with the recesses 16.

In order to prevent excessive turning movements of the collar and dust cap within the nut, I provide a stop lug 21 near one end of one of the locking lugs 18 and which at all times is projected through one of the recesses 16 and limits the movement of the collar and dust cap by engaging with the flanges 15 at either end of the recess. Thereby the turning movement necessary to attach or detach the dust cap is limited to one-fourth revolution, whereas in the case of the screw-threaded dust caps formerly employed, as many as twenty-five turns are often necessary to remove or replace said cap.

The device herein described embodies features of simplicity and economy of construction and affords an exceedingly quick connection for dust caps, which is positive and secure in its operation at all times.

Having thus described my invention, what I claim and desire to secure by Letters Patent is—

1. In combination with a pneumatic tire and its valve, a valve stem and a screw-threaded fastening nut therefor, a dust cap for said stem fitting loosely thereon, spring actuated locking connections between said cap and nut, said locking connections comprising a shell formed on the exterior of said nut, a flanged and recessed plate on said shell, wings on the cap to enter said recesses, a collar beneath said recessed plate, a spring for pressing said collar into engagement with said plate, lugs on said collar normally seated beneath the flanges of said plate, whereby the wings on the cap may be inserted through the recesses to lie between the lugs on the collar, and the cap thereupon turned to present its wings beneath the flanges on said plate, whereupon the lugs on said collar will be moved into register with the recesses and said collar pressed outwardly by the spring to thereby lock itself and the dust cap against further rotation.

2. In combination with a pneumatic tire and its valve, a valve stem and a screw-threaded fastening nut therefor, a dust cap for said stem fitting loosely thereon, spring actuated locking connections between said cap and nut, said locking connections comprising a shell formed on the exterior of said nut, a flanged and recessed plate on said shell, wings on the cap to enter said recesses, a collar beneath said recessed plate, a spring for pressing said collar into engagement with said plate, lugs on said collar normally seated beneath the flanges of said plate, whereby the wings on the cap may be inserted through the recesses to lie between the lugs on the collar, and the cap thereupon turned to present its wings beneath the flanges on said plate, whereupon the lugs on said collar will be moved into register with the recesses and said collar pressed outwardly by the spring to thereby lock itself and the dust cap against further rotation, and means for limiting the rotative movement of said collar on the nut to less than a full turn.

3. In combination with a valve, a threaded valve stem, a nut for said valve stem, a dust cap for said stem fitting loosely thereon, a locking plate, means for securing said plate to said nut, locking means on said locking plate, locking means on said cap for engaging the locking means on said plate to hold the cap on said nut, in position over said valve stem, a rotatable collar surrounding said valve stem below said plate, locking means on said collar for engaging the locking means on said cap to lock said collar and cap together against turning with relation to each other, and for engaging the locking means on said locking plate to prevent said collar and said cap from turning with relation to said plate, and a spring in said nut for pressing said collar and the locking means on said cap toward said plate and for forcing the locking means on said collar and said cap into locking engagement with the locking means on said plate, and said cap and collar being adapted to be depressed to disengage the locking means on said collar from the locking means on said plate and turned to unlock the cap and plate so that the cap may be removed.

4. In combination with a pneumatic tire and its valve, a valve stem and a screw-threaded fastening nut therefor, a dust cap for said stem fitting loosely thereon, and spring actuated locking connections between said cap and nut, said locking connections comprising a recessed plate on said nut, wings on the cap to enter said recesses, and a collar, spring-pressed against said plate and having locking lugs to enter said recesses, when the cap is turned to move the wings out of register with the recesses.

In testimony whereof I have hereunto set my hand in the presence of two subscribing witnesses.

LESTER L. GARIBALDI.

Witnesses:
JOHN H. HERRING,
W. W. HEALEY.